United States Patent Office 3,000,881
Patented Sept. 19, 1961

3,000,881
PROCESS FOR PREPARING AN
α-HALOGENO-LACTAM
Johannes H. Ottenheym, Sittard, and Johan W. Garritsen, Geleen, Netherlands, assignors to Stamicarbon N.V., Heerlen, Netherlands
No Drawing. Filed Sept. 10, 1959, Ser. No. 839,075
Claims priority, application Netherlands Sept. 25, 1958
5 Claims. (Cl. 260—239.3)

The present invention relates to the preparation of α-halogen-lactams.

It has been found that practically theoretical amounts of α-halogen-lactams can be obtained if azacyclo-2.3. alkene-2.chloro-N-carbochloride is brought into reaction with a hypohalogen compound in the presence of water.

The reaction of the carbochloride with the hypohalogen compound can be carried out in a simple way by bringing the reaction components together in an aqueous medium and heating them for some time, generally not longer than half an hour, with simultaneous stirring. It is not necessary to use high temperatures above 100° C., as the reaction proceeds smoothly at a maximum temperature of 50–90° C.

In order to avoid the formation of by-products, it is advisable to operate first at a low temperature of 0–20° C. for, for example 1 to 2 hours, and subsequently to increase the reaction temperature gradually to 60–70° C. for from ½ to 1 hour. In the reaction, hydrogen chloride and carbonic acid are formed, the carbonic acid escaping from the reaction mixture.

The hypocompounds of chlorine, bromine, iodine and fluorine may be used as the hypohalogen compound. Examples of suitable hypocompounds are hypohalogenic acids, such as hypochlorous acid or hypobromous acid, and salts such as sodium hypochlorite, potassium hypoiodite and calcium hypochlorite.

According to a preferred way of carrying out the present invention, the hypohalogen compound is used in the form of a reaction product obtained by bringing a hydroxide and/or oxide suspended in water into reaction with a halogen.

In the azacyclo-2.3.alkene-2.chloro-N-carbochlorides, which are used according to the invention, the number of carbon atoms of the alkene hydrocarbon group may be varied and may amount to e.g. 5, 6 or 7 carbon atoms. A suitable compound is, for instance, azacyclo-2.3.heptene-2.chloro-N-carbochloride. The alkene hydrocarbon group may also contain more carbon atoms, e.g. 10, 11 or 12 atoms.

From these carbochlorides the corresponding α-halogen-lactams are formed. These α-halogen-lactams form as an organic phase in the reaction mixture and may be separated from the reaction mixture in a simple way, e.g. by extraction with a solvent, such as benzene, toluene, chloroform or carbon tetrachloride.

The reactant proportions may be widely varied. Generally speaking, from 1 to 2.5 moles of the hypohalogen compound per mol of carbochloride may be used. The reaction pressure may vary from atmospheric up to, for example, 5 or 10 atmospheres or higher.

The amount of water utilized may also be varied. Sufficient water should be used to facilitate stirring. Generally speaking, the water will constitute from 5000 to 150% by weight of the hypohalogen compound although more or less than that stated may be used.

The products obtained are valuable for preparing medicines, especially analeptics, due to their pharmacological activity.

The invention is illustrated, but not limited, by the following examples:

Example 1

350 g. of azacyclo-2.3 heptene-2.chloro-N-carbochloride is added, with simultaneous stirring, to 4.5 liters of a 3.5% by weight solution of hypochlorous acid in water, while the temperature is kept at 5–10° C.

Subsequently, the temperature is gradually raised to 65° C. in one-half hour.

The reaction mixture is extracted four times with 250 ml. of chloroform, after which the chloroform solutions are combined. When the chloroform is evaporated, the α.mono-chloro-caprolactam (melting point 92° C.) crystallizes.

The yield of lactam is 265 g., which corresponds with a yield of 99.8%.

Example 2

Under otherwise identical conditions as indicated in Example 1, 6.7 liters of a 3% by weight solution of hypobromous acid in water are used instead of the hypochlorous acid solution.

In this way 345 g. of α-bromo-caprolactam (melting point 111–112° C.) are obtained, corresponding with a yield of 99.8%.

Example 3

A solution of 149 g. of sodium hypochlorite and 117 g. of sodium chloride in 1 liter of water, obtained by passing chlorine into an aqueous sodium hydroxide solution, is cooled down to 0° C. While the temperature is kept at 0–3° C., 291 g. of azacyclo-2.3.heptene-2.chloro-N-carbochloride are added with simultaneous stirring. Stirring is continued at that temperature for 20 minutes. Subsequently, the mixture, which is reacting with evolution of gas, is slowly heated to a maximum temperature of 70° C. in half an hour and then cooled down to 0° C.

The α-chloro-caprolactam crystals formed are separated off by filtration, washed with ice water and then dried. The amount of crystals is 110 g.

The aqueous liquid is extracted with chloroform. After removal of the solvent, 110 g. of α-chloro-caprolactam is obtained from the chloroform solution.

The yield is 99.5%.

Example 4

Into a suspension obtained by introducing 150 g. of calcium hydroxide into 1500 ml. of water, chlorine is led with simultaneous stirring at a temperature of 3–4° C., until the pH amounts to 7–7.5. Then, 135.8 g. of azacyclo-2.3 heptene-2.chloro-N-carbochloride (0.7 mol) are added with simultaneous stirring and the mixture is stirred for ¼ hour at a temperature of 10–20° C. Subsequently, the temperature of the mixture, reacting with evolution of gas is slowly raised to 70° C. in ½ hour.

The α.chloro-caprolactam formed is extracted from the reaction mixture with chloroform. After removal of the solvent, the last traces of which are removed in vacuo with a nitrogen current, 103 g. of α-chloro-caprolactam are obtained (yield 99.8%).

Having described the invention, what is claimed as new is:

1. A process for preparing an α-halogeno-lactam which comprises reacting an azacyclo-2.3.alkene-2.chloro-N-carbochloride in which the alkene group contains up to 12 carbon atoms and a hypohalogen compound selected from the group consisting of hypohalogenic acid and alkali metal and alkaline earth metal hypochlorites by mixing the reactants together in the presence of water.

2. The process of claim 1 wherein the reaction temperature is between 0 and 100° C.

3. The process of claim 1 wherein the reaction is first carried out by mixing at a temperature of 0–20° C. and the reaction temperature is subsequently raised to 60–70° C.

4. The process of claim 1 wherein the hypohalogen compound is the product obtained by reacting a member of the group consisting of alkali metal and alkaline earth metal hydroxides and oxides suspended in water with halogen.

5. The process of claim 1 wherein said product is recovered from the reaction mixture by solvent extraction.

References Cited in the file of this patent

FOREIGN PATENTS 213,492   Australia _____ May 23, 1957